June 24, 1930.   P. B. LEDWELL   1,767,933
REVERSIBLE CLUTCH
Filed Oct. 17, 1929   2 Sheets-Sheet 2

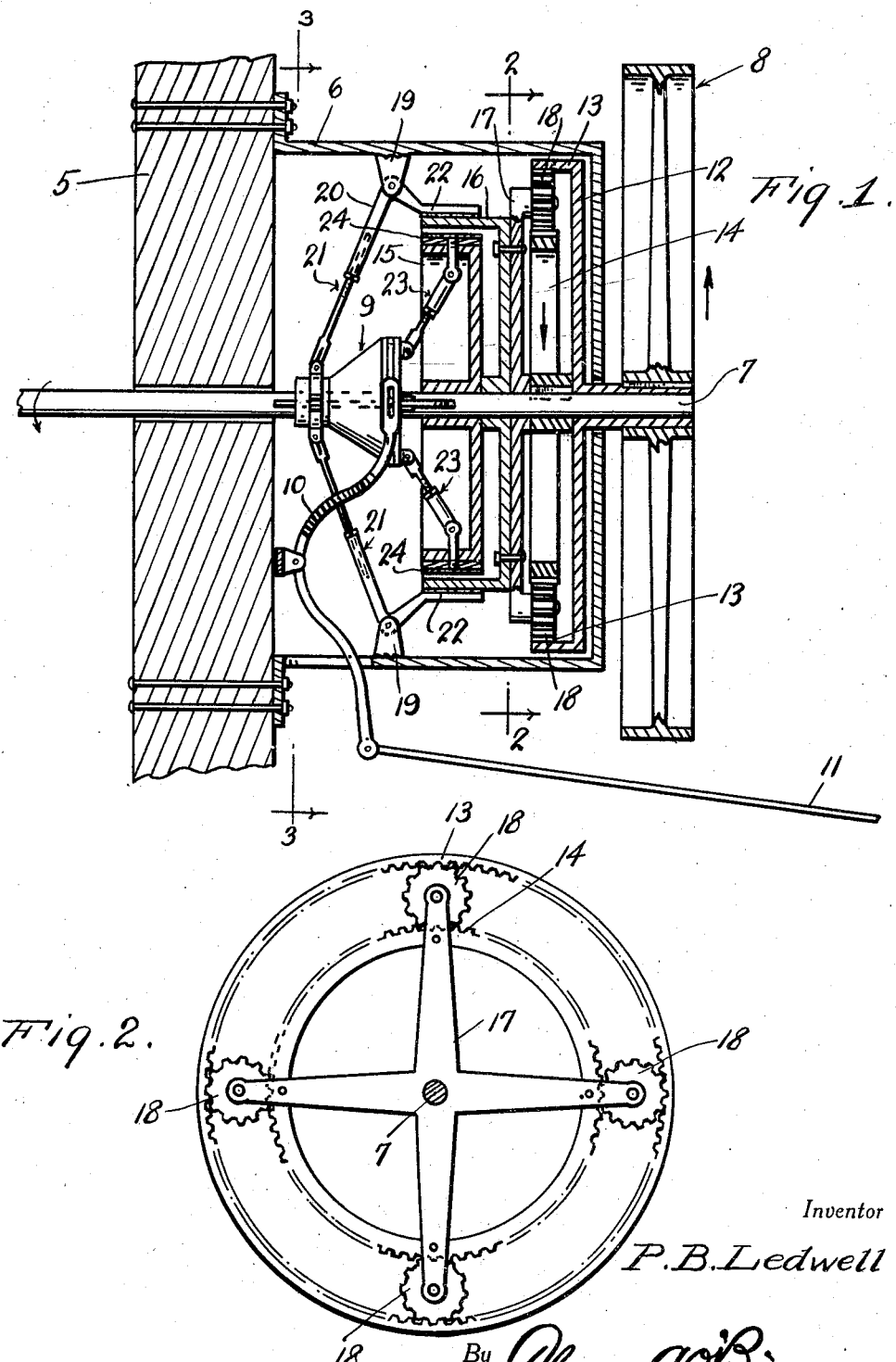

Inventor
P. B. Ledwell
By Clarence A. O'Brien
Attorney

Patented June 24, 1930

1,767,933

UNITED STATES PATENT OFFICE

PERCY BAXTER LEDWELL, OF MINERVA, TEXAS

REVERSIBLE CLUTCH

Application filed October 17, 1929. Serial No. 400,289.

This invention relates to the board class of machine elements and has more particular reference to certain improvements embodied in a clutch structure which enables it to be adjusted by a single control device for rotating a shaft in a forward direction, in a reverse or rearward direction, or permits the clutch mechanism to be disposed in neutral.

The invention is susceptible of incorporation in various classes of machinery requiring clutches of this type and is especially, but not necessarily adapted for use in oil well equipment where a quick reversing action is highly desirable by using a single control device.

My object is to provide a clutch structure of this variety which is characterized by novel details associated with each other to produce an equally novel organization of parts, wherein these parts cooperate in proper intermittent relationship to afford dependable driving of the shaft in either direction or to permit the structure to be thrown into neutral at will.

The specific details and their particular cooperation will become more readily apparent from the following description and drawings.

In the drawings:

Figure 1 is a view in section and elevation showing the complete assemblage with the clutch mechanism set for driving the shaft in one direction.

Figure 2 is a vertical transverse section on the line 2—2 of Figure 1.

Figure 3:
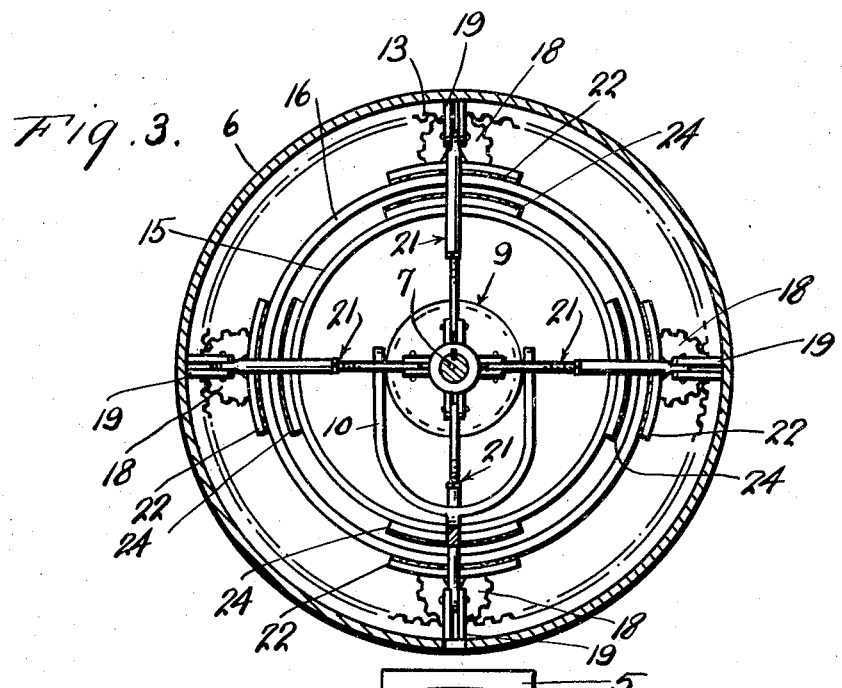
Figure 3 is a similar section on the line 3—3 of Figure 1.
Figure 4:
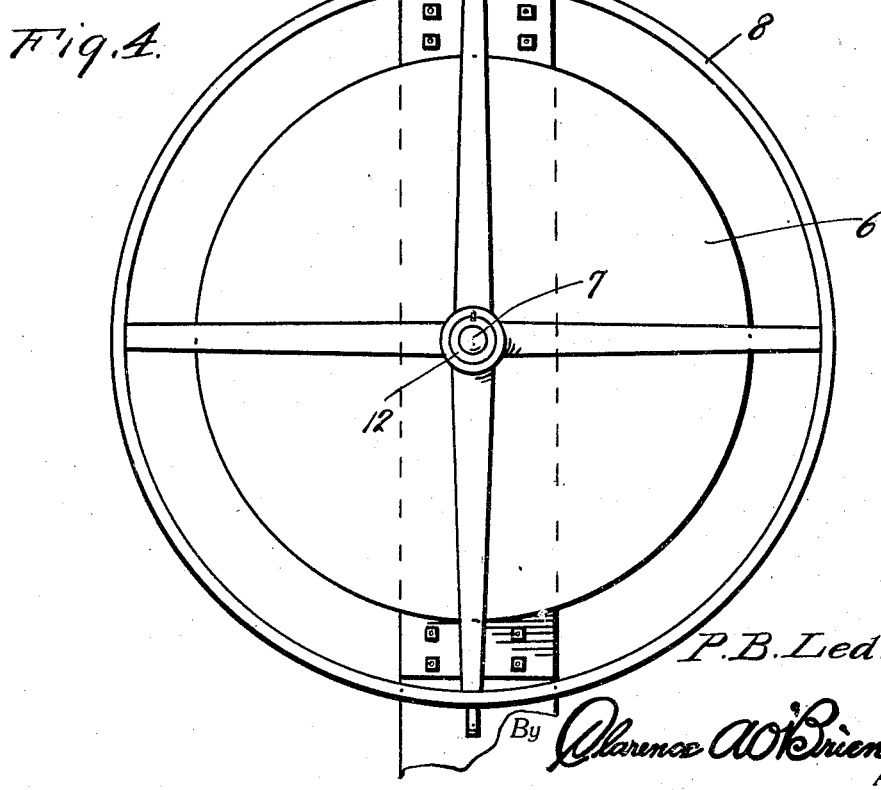
Figure 4 is an end view of the structure seen in Figure 1 observing the same in the direction from right to left.

The complete assemblage may well be seen in Figure 1 wherein it will be observed that 5 designates a relatively stationary support and 6 a housing mounted thereon. The rotary shaft is indicated by the numeral 7 and the power propulsion pulley which is keyed thereto is indicated at 8. On this shaft and slidably keyed thereto is a substantially conical shift device 9 and the arms of a forked operating lever 10 are operatively connected thereto in a manner to permit rotation of the shift device with the shaft 7. The lever 10 is under control of an operating rod 11.

The pulley, it will be observed, is fastened to the hub portion of a disc 12 carrying a toothed rim 13. This is an outer ring gear. It is disposed in concentric relation with an inner ring gear 14 keyed on the shaft 7.

The reference character 15 designates an inner drum which is fixed on the shaft 7. Associated with this is an outer concentric idling drum 16 which is fastened to a spider 17 carrying planetary pinions 18 located for cooperation with the ring gears 13 and 14 respectively as clearly shown in Figure 1.

I next call attention to the operating connection between the longitudinally shiftable device 9 and the drums 15 and 16. To begin with, I provide relatively stationary brackets as at 19 in the housing 6. Bellcranks 20 are pivotally connected to these and one arm of the bellcrank constitutes a part of a turn buckle 21 which is connected at its inner ends to the device 9. The remaining arm of the bellcrank carries an arcuate friction shoe 22 which is arranged for frictional driving engagement with the periphery of the drum 16. Similar adjustable turnbuckles are provided at 23 and connected at their inner ends with the conical shifting device 9. At their outer ends they are connected with clutch shoes 24 adapted for engagement with the inner side of the drum 16.

Thus I provide two sets of distinguishable friction shoes for cooperation with a drum. It will therefore be seen that when the lever 10 is shifted in one direction by means of the rod 11, the friction clutch shoes 24 will be brought into engagement with the inner side of the drum 16 to frictionally couple the drums 15 and 16 together and rotate the shaft 7 in one direction. When however the device 9 is reversed, the shoes 24 are disengaged from the drum 16 and the shoes 22 will be brought into braking engagement with the outer side of said drum 16 and hold the same and spider against rotation, which, through the medium of the ring gears and pinion gears will serve to rotate the shaft in a reverse direction.

An intermediate position of the device 9 will dispose the structure in neutral. A reversible clutch structure of this type will be found highly advantageous in various classes of machinery, and particularly in oil well equipment where a reversing of the pulley shaft is found highly advantageous.

It is thought that by considering the description in connection with the drawings a clear understanding of the construction, the assembly, and the method of operation will be clear to persons skilled in the art to which the invention relates. Therefore, a more lengthy description is regarded unnecessary.

Minor changes in shape, size and rearrangement of parts may be resorted to in actual practice if desired.

Having thus described the invention, what is claimed as new is:

In a clutch structure of the character described, a housing, a shaft mounted for rotation in the housing, a ring gear fixed on the shaft, a ring gear loosely mounted on the shaft and disposed in spaced concentric relation to the fixed ring gear, means for driving the loosely mounted ring gear, a spider loosely mounted on the shaft, pinion gears rotatably mounted on the spider and disposed between the ring gears and in mesh therewith, a drum loosely mounted on the shaft and rigidly connected to the spider, a drum fixed on the shaft and disposed concentrically in the loosely mounted drum and spaced therefrom, frictional brake shoes pivotally mounted on the housing and engageable with the outer side of the loosely mounted drum in a manner to retain same against rotation, frictional clutch shoes disposed between the drums and mounted for radial sliding movement on the fixed drum for engagement with the inner side of the loosely mounted drum for frictionally coupling the drums together for rotation in unison, a shift device slidably mounted on the shaft for rotation therewith, adjustable means for operatively connecting the shift to the brake and clutch shoes in a manner to simultaneously move same to operative and inoperative position and manually operable means for actuating the shift device.

In testimony whereof I affix my signature.

PERCY BAXTER LEDWELL.